US012657222B2

(12) United States Patent
Shaw et al.

(10) Patent No.: US 12,657,222 B2
(45) Date of Patent: *Jun. 16, 2026

(54) PROCESSING DATA PORTIONS ASSOCIATED WITH SELECTABLE SEARCH ALGORITHM EXECUTION

(71) Applicant: Yext, Inc., New York, NY (US)

(72) Inventors: Maxwell Shaw, Arlington, VA (US); Maxwell Davish, Brooklyn, NY (US); Michael Misiewicz, Brooklyn, NY (US); Michael Dunn, Arlington, VA (US)

(73) Assignee: Yext, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/968,051

(22) Filed: Dec. 4, 2024

(65) Prior Publication Data

US 2025/0094463 A1      Mar. 20, 2025

Related U.S. Application Data

(63) Continuation of application No. 17/697,548, filed on Mar. 17, 2022, now Pat. No. 12,182,187.

(Continued)

(51) Int. Cl.
| | |
|---|---|
| G06F 16/3332 | (2025.01) |
| G06F 16/9538 | (2019.01) |
| G06N 5/02 | (2023.01) |

(52) U.S. Cl.
CPC ...... *G06F 16/3334* (2019.01); *G06F 16/9538* (2019.01); *G06N 5/02* (2013.01)

(58) Field of Classification Search
None
See application file for complete search history.

(56) References Cited

U.S. PATENT DOCUMENTS

| | | | |
|---|---|---|---|
| 7,873,765 B1 * | 1/2011 | Herf | G06Q 30/02 |
| | | | 715/740 |
| 9,934,523 B1 | 4/2018 | Brock | |

(Continued)

FOREIGN PATENT DOCUMENTS

| CA | 3117203 A1 | 4/2020 |
|---|---|---|

OTHER PUBLICATIONS

Extended European Search Report in corresponding European Application No. 22772214.7 Dated Feb. 17, 2025 (9 pages).

(Continued)

*Primary Examiner* — Thu N Nguyen
(74) *Attorney, Agent, or Firm* — Jeffri A. Kaminski; Venable LLP

(57) ABSTRACT

A system and method to receive a search query input from an end user system, wherein the search query input relates to information associated with a merchant system. In view of the search query, a document associated with the merchant system is identified. A set of portions of the document are identified. A keyword-matching density level is determined for each portion of the set of portions of the document. A selected portion of the set of portions having a highest relative keyword-matching density level is identified. A graphical user interface including a search result responsive to the search query is generated, the graphical user interface including the selected portion of the document.

20 Claims, 5 Drawing Sheets

Related U.S. Application Data

(60) Provisional application No. 63/162,385, filed on Mar. 17, 2021.

(56) References Cited

U.S. PATENT DOCUMENTS

| | | | |
|---|---|---|---|
| 2008/0086384 A1 | 4/2008 | Srinivasan et al. | |
| 2009/0216735 A1 | 8/2009 | Dexter et al. | |
| 2012/0226675 A1 | 9/2012 | Dexter et al. | |
| 2013/0212103 A1* | 8/2013 | Cao ..................... | G06F 16/215 |
| | | | 707/E17.046 |
| 2016/0179934 A1 | 6/2016 | Stubley et al. | |
| 2018/0349981 A1 | 12/2018 | Grandhi | |
| 2018/0365318 A1 | 12/2018 | Yi et al. | |
| 2019/0012476 A1 | 1/2019 | Dorogoy | |
| 2019/0306137 A1 | 10/2019 | Isaacson et al. | |
| 2022/0172039 A1* | 6/2022 | Liu .......................... | G06N 3/08 |

OTHER PUBLICATIONS

International Search Report and Written Opinion in International Application No. PCT/US2022/020772 mailed Jul. 8, 2022 (15 pages).

* cited by examiner

How many straws does Company ABC save with strawless lids? — 205

One billion ◄— 220

230

"Over the past year, Company ABC has trialed new lightweight, recyclable strawless lids in select markets across the U.S. and Canada. Due to the success of this test, the company is rolling out strawless lids to company-operated and licensed stores, marking a significant milestone in Company ABC's effort to eliminate one billion plastic straws globally per year. Company ABC will continue to shift away from single-use packaging and plastics as part of its resource positive commitment announced in January."

210

Read more from *Company ABC's Strawless Lids Now Available Across the U.S. and Canada* (Day, Month, Year)

Why is this answer relevant? | Feedback

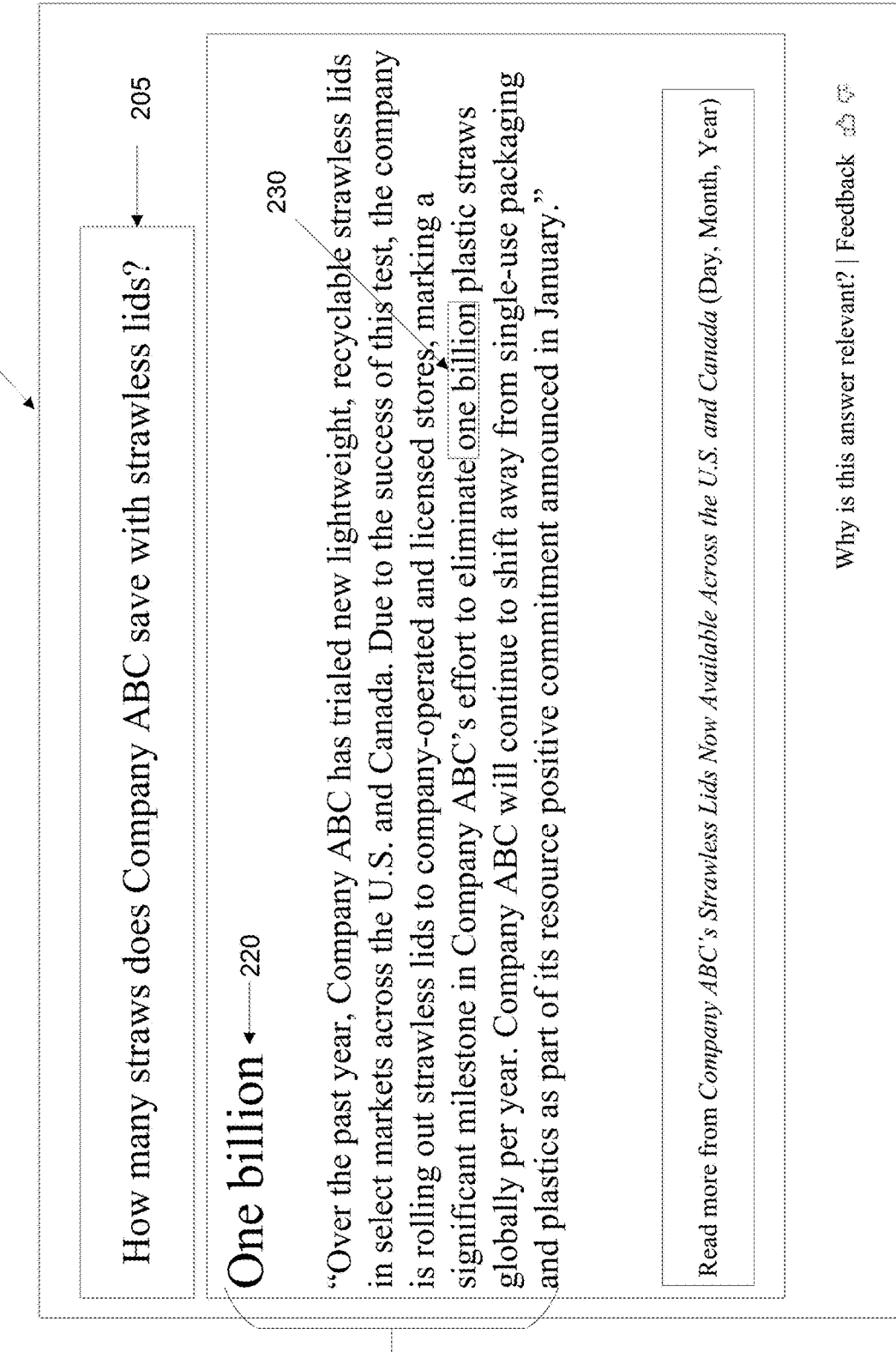

FIGURE 3

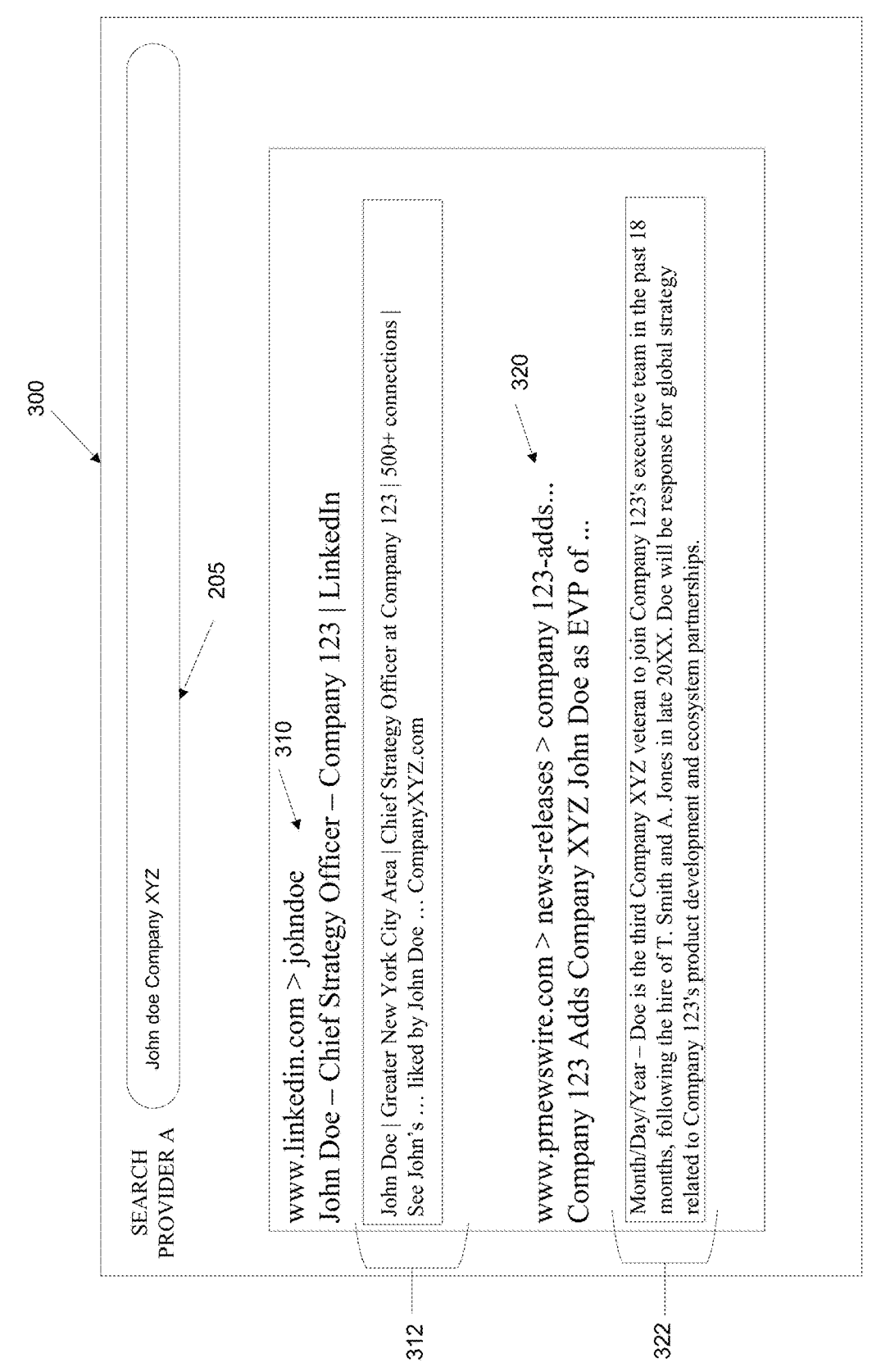

300

SEARCH
PROVIDER A

John doe Company XYZ

205 www.linkedin.com > johndoe    310
John Doe – Chief Strategy Officer – Company 123 | LinkedIn John Doe | Greater New York City Area | Chief Strategy Officer at Company 123 | 500+ connections |
See John's ... liked by John Doe ... CompanyXYZ.com

312 www.prnewswire.com > news-releases > company 123-adds...    320
Company 123 Adds Company XYZ John Doe as EVP of ...

Month/Day/Year – Doe is the third Company XYZ veteran to join Company 123's executive team in the past 18
months, following the hire of T. Smith and A. Jones in late 20XX. Doe will be response for global strategy
related to Company 123's product development and ecosystem partnerships.

322

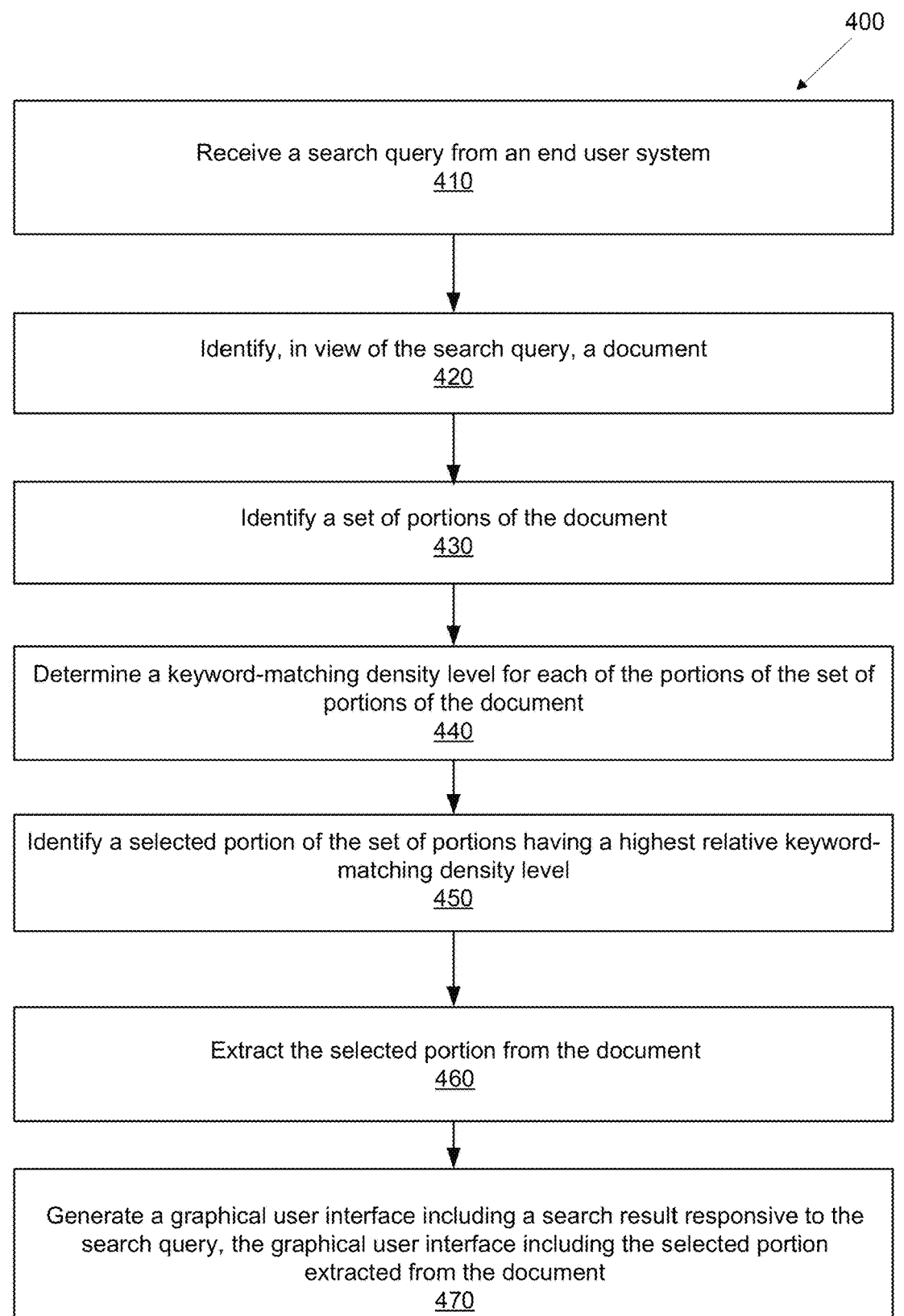

400

Receive a search query from an end user system
410

Identify, in view of the search query, a document
420

Identify a set of portions of the document
430

Determine a keyword-matching density level for each of the portions of the set of portions of the document
440

Identify a selected portion of the set of portions having a highest relative keyword-matching density level
450

Extract the selected portion from the document
460

Generate a graphical user interface including a search result responsive to the search query, the graphical user interface including the selected portion extracted from the document
470

FIG. 4

PROCESSING DATA PORTIONS ASSOCIATED WITH SELECTABLE SEARCH ALGORITHM EXECUTION

CROSS-REFERENCE TO RELATED APPLICATION

This application a continuation application of U.S. patent application Ser. No. 17/697,548, filed on Mar. 17, 2022, which claims the benefit of U.S. Provisional Patent Application No. 63/162,385 filed on Mar. 17, 2021, all of which are hereby incorporated by reference in their entireties.

TECHNICAL FIELD

The disclosure relates generally to a search platform to provide search results relating to data associated with a merchant system.

BACKGROUND

Conventionally, an end-user (e.g., a consumer) may conduct a search for information about a merchant using a third party search engine (e.g., Google™, Bing™, Yahoo!™ Search) or a third-party platform (e.g., Yelp™, YouTube™, etc.). It is increasing important for a merchant to have accurate and consumable search results associated with the merchant provided to a consumer.

A merchant may have their related data organized on a platform that is searchable using multiple different search algorithms and search provider systems. The platform can be organized as a knowledge graph associated with the merchant which stores the merchant's publicly facing, structured data as entities that enable multiple different output formats, such as listings, pages and "answers" including data structured as an answer to a search query (e.g., a frequently asked question (FAQ)-type format).

The merchant data can include documents (e.g., unstructured documents) having a variety of different forms and formats. However, it is difficult to provision relevant and responsive data from an unstructured document as a search result in response to a search query relating to a merchant. For example, a user system may submit a search query that is submitted in the form of a question. The response, or search result, can include an answer to the unstructured search query. A typical search platform or engine employs a "chunking" approach that enables searching in only a beginning portion of numerous documents in order to find matches to include in a search result set. However, a document may have a chunk or passage that is most relevant to a particular search query that is not located at a beginning portion of the document. As such, chunking approaches that are limited to only the beginning portions of a document may result in missing or failing to identify a document that is the most relevant for inclusion in a search result set.

BRIEF DESCRIPTION OF THE DRAWINGS

The present disclosure is illustrated by way of example, and not by way of limitation, and can be more fully understood with reference to the following detailed description when considered in connection with the figures as described below.

FIG. 2 illustrates an example display generated by the search algorithm management system that includes a direct answer featured snippet portion as a response to a search query submitted by an end-user system in accordance with implementations of the present disclosure.

FIG. 3 illustrates an example display including inline featured snippet portions that are generated by the search algorithm management system in accordance with implementations of the disclosure.

FIG. 4 illustrates a flow diagram relating to an example method including operations performed by a search algorithm management system in accordance with implementations of the present disclosure.

DETAILED DESCRIPTION

Figure 1:
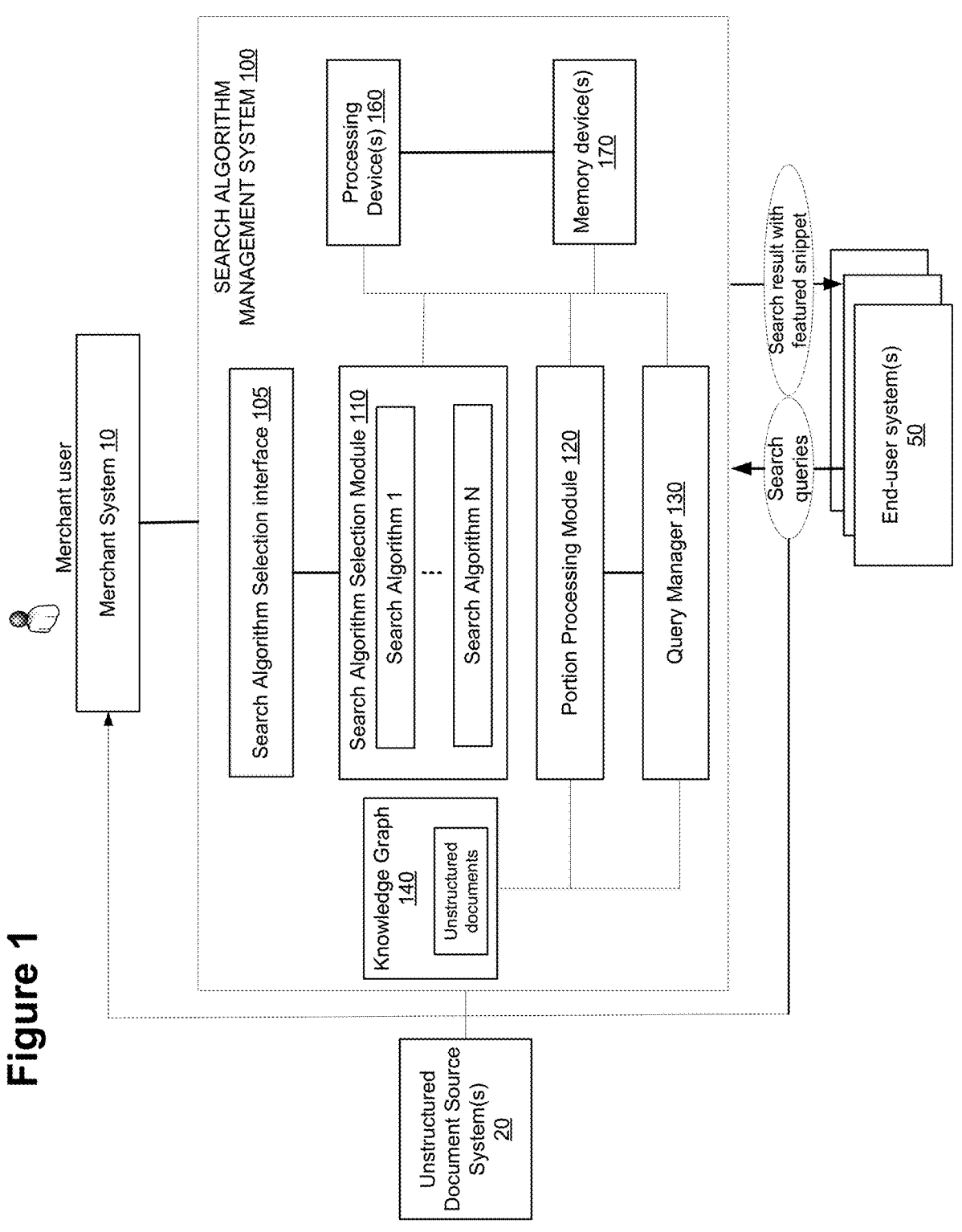
FIG. 1 illustrates an example of a computing environment including a search algorithm management system to generate an initial a set of matching search results corresponding to a search query in accordance with one or more aspects of the present disclosure.

The present disclosure is illustrated by way of example, and not by way of limitation, and can be more fully understood with reference to the following detailed description when considered in connection with the figures provided and described herein.

Aspects of the present disclosure relate to a method and system (also referred to as a "search algorithm management system") to receive a search query relating to data associated with a merchant system. In an embodiment, the search algorithm management system generates an initial a set of matching search results corresponding to the search query. In an embodiment, the system identifies and generates portions or chunks of one or more identified search results prior to provisioning of a set of one or more search results to the end-user system.

In an embodiment, the search results in response to a query are returned by the search algorithm and analyzed to identify a featured snippet or portion corresponding to a density-based analysis. For example, the density-based analysis can be performed on a long unstructured document of the search results to identify a portion of the document having a highest level of density of matching keywords. The highest density portion is identified and transformed into a "featured snippet" or extracted portion for provisioning or surfacing to an end user in response to the search query.

According to embodiments, the system and method generates the featured snippet portions by applying a "chunking" process to an initial set of search results. In an embodiment, the system and method transform at least a portion of initial search results data into portions or "chunks". In an embodiment, a set of "top results" identified by a search algorithm are partitioned into chunks and process to enable the generation of the featured snippet portion as part of the search results returned to the end-user system.

In an embodiment, the keyword-matching density based portioning or chunking process is applied to identify a selected portion or chuck of an unstructured search document. In an embodiment, the method and system identify the most relevant results in a vertical, turn that data into chunks to enable a search algorithm to identify a set of search results, and the search algorithm can return a "featured snippet" with a portion of the text corresponding to a highest relevance highlighted.

In an embodiment, the method and system allows a merchant user (e.g., a user associated with the merchant system) to select a search algorithm from a set of multiple different search algorithms to employ for a respective type of data within the knowledge graph associated with the merchant system. In an embodiment, the search algorithm management system of the present disclosure can utilize multiple different entity types (e.g., categories or classifiers of information) to organize the searchable information or data to generate a search result including the desired information in response to a query. The different entity types can be a system-based entity type (e.g., a default entity type generated by the knowledge search system and used by multiple different entities; also referred to as a "system entity type") and a customized entity type (e.g., an entity type generated by the knowledge search system in accordance with instructions from a particular entity). In an embodiment, the customized entity types (also referred to as "custom entity types") can be generated, selected, and managed by an entity to provide a searchable informational element for us in generating search results in response to an end user search.

In an embodiment, a custom entity type can be mapped, linked, associated with, or logically connected to another entity type via a relationship type. In an embodiment, a relationship type can include a defined association between multiple entity types. For example, multiple custom entity types can be associated by one or more relationship types. In another example, a custom entity type and a system entity type can be linked by one or more relationships types. Advantageously, the customized entity types and relationship types enable an entity user to update entity data via the knowledge search system (e.g., at a single "location" or via a system) and have the entity data updated on and across multiple different publisher systems (e.g., multiple different search engines). In this regard, via a single interaction, an entity user (e.g., a company) can update entity data by updating, adding, modifying, changing, etc. data associated with a first entity type and have a corresponding data update executed with respect to other entity types that are associated with the first entity type by one or more established relationship types. This enables the entity data to be updated across multiple different publisher systems to establish uniformity and consistency in the type, quality, and accuracy of the entity data returned by the different publisher systems to an end user in response to a query.

FIG. 1 illustrates an example search algorithm management system 100 according to embodiments of the present disclosure. In one embodiment, the search algorithm management system includes one or more modules, one or more processing devices and one or more memory devices configured to execute and store instructions associated with the functionality of the various components, services, and modules of the search algorithm management system, as described in greater detail below in connection with FIGS. 1-5.

The search algorithm management system 100 may be communicatively connected to one or more merchant systems 10, one or more unstructured document source systems 20, and one or more end-user systems 50 via a suitable communication network. In an embodiment, the search algorithm management system 100 may be accessible and executable on one or more separate computing devices (e.g., servers). In an embodiment, the search algorithm management system 100 may be communicatively coupled to the merchant system 10, unstructured document source system 20, and end-user system 50 via any suitable interface or protocol, such as, for example, application programming interfaces (APIs), a web browser, JavaScript, etc. In an embodiment, the search algorithm management system 100 includes a memory 170 to store instructions executable by one or more processing devices 160 to perform the instructions to execute the operations, features, and functionality described in detail herein.

According to embodiments, the search algorithm management system 100 can include one or more software and/or hardware modules to perform the operations, functions, and features described herein in detail, including a search algorithm selection module 110, a portion processing module 120, and a query manager 130. In one embodiment, the components or modules of the search algorithm management system 100 may be executed on one or more computer platforms that are interconnected by one or more networks, which may include a wide area network, wireless local area network, a local area network, the Internet, etc. The components or modules of the search algorithm management system 100 may be, for example, a hardware component, circuitry, dedicated logic, programmable logic, microcode, etc., that may be implemented in the processing device(s) 160 to execute instructions stored in the one or more memory devices 170 of the search algorithm management system 100.

In an embodiment, the search algorithm selection module 110 is configured to generate a graphical user interface (e.g., the search algorithm selection interface 105) for provisioning to one or more merchant systems 10. The search algorithm selection interface 105 includes a display of selectable options to enable a merchant system 10 to select a search algorithm from a set of search algorithms (e.g., search algorithm 1 through search algorithm N) to apply to a search query associated with a search context associated with the search query. In an embodiment, particular search type or entity type, as described herein. In an embodiment, the search algorithm selection module 110 tracks the selections submitted by the merchant system 10 and processes search queries received from one or more end-user systems 50 using the selected search algorithm corresponding to each respective search query.

In an embodiment, in response to receiving of a search query from an end-user system 50, the search algorithm selection module 110 identifies a search context associated with the search query. The search context can be defined by one or more of a search type or an entity type associated with the search query. A search type can represent a type of "intent" associated with a search. The context for a search type can be established based on a configuration of a search experience provided by a merchant system. For example, a first merchant system may have many support articles while a second merchant system may have a large number of locations (i.e., not text) which can be expressed in the configuration for the corresponding merchant system search experience. In an embodiment, an automatic inference can be generated based on the kinds of entities the merchant system has stored in their respective data graph (e.g., the merchant system knowledge graph).

The selected search algorithm is executed by the query manager 130 in response to a search query received from an end-user system 50. The query manager 130 applies the selected search algorithm that corresponds to the search context of the search query to generate a set of candidate search results (i.e., a set of documents including one or more unstructured documents).

In an embodiment, the portion processing module 120 is configured to review each unstructured document of the set of candidate search results and perform data portioning or "chunking" processes to identify a set of portions of the document. The portion processing module 120 is configured to determine a keyword-matching density level for each portion of the set of portions, as described in greater detail below. In an embodiment, the keyword-matching density level represents a relative density of keywords associated with the search query to a total set of words in a respective portion of the document. In an embodiment, the keyword-matching density level can be expressed as a quantity, ratio or percentage that characterizes a relative relevancy of each portion of the document to the other portions of the document. In an embodiment, a portion of the document having a highest relative keyword-matching density level (e.g., a highest ratio of keywords to total words in the section) as compared to the other calculated keyword-matching density levels can be identified by the portion processing module 120. The selected portion identified by the portion processing module 120 can be provided to the query manager 130. In response, the query manager 130 can extract the selected portion from the unstructured document and generate a "featured snippet" including the selected portion for display to the end-user system 50 in response to the search query. Advantageously, the portioning process based on the keyword-matching density levels enables selected portions of an unstructured document having a highest relevancy to be surfaced to an end-user system 50 as part of a search result set responsive to a search query.

In an embodiment, the query manager 130 is configured to receive search queries from the end-user system (e.g., either directly or as submitted via the merchant system 10 or a third-party search platform) and process the search result output provided to the end-user systems 50 in response to the search queries. In an embodiment, the query manager 130 can generate an interface including a search result with the featured snippet including the selected portion generated by the portioning process.

According to embodiments, the search algorithm management system 100 includes a data graph (e.g., knowledge graph 140) storing data associated with a merchant system 10 including a collection of unstructured documents that are searchable using multiple different search algorithms to identify data for provisioning in response to a search query. In an embodiment, the search algorithm management system 100 is configured to generate one or more interfaces for interaction with a merchant user via the merchant system 10 to assign, designate or select a search algorithm from the set of search algorithms to use in a particular search context. In an embodiment, the search context can be defined based on an entity type, such that the merchant system can identify a preferred or selected search algorithm to apply for searching data of a particular entity type. In an embodiment, the knowledge graph can include unstructured documents that are received from one or more unstructured document source systems 20. In an embodiment, the knowledge graph 140 (also referred to as a "data graph", "user data graph" or a "user knowledge graph") includes elements of structured data that is indexed and searchable to identify data corresponding to a set of documents (i.e., unstructured documents and structured documents) associated with the merchant system 10. In an embodiment, the knowledge graph 140 is generated, managed, and updated in a graph database that can be searched using a search algorithm (e.g., search algorithm 1 . . . search algorithm N) selected by the search algorithm selection module 110 to generate search results in response to a search query received from an end-user system 50. The search results include a featured snippet with a selected portion of an unstructured document that is identifying using a keyword-matching density portioning process.

In an embodiment, the search algorithm management system 100 can generate search result data for multiple different categories or verticals. In an embodiment, a search result vertical can be organized with a searchable field (e.g., a "documentSearch" field) corresponding to the searching of unstructured documents. In an embodiment, the searchable field associated with the unstructured documents can be used to identify and generate (via a user interface) a featured snippet for inclusion in the search results returned to the end-user system 50.

In an embodiment, a first type of featured snippet portion (also referred to as a "direct answer featured snippet portion" or a "direct answer-type featured snippet portion") is generated in response to the identification of an "answer" or "direct answer" search result within a body of an unstructured document that is responsive to a search query (e.g., a search query in the form of a question). In an embodiment, the system searches for a direct answer (e.g., a search result) in a top scoring document of a search result vertical configured with the "documentSearch" field or filter. In an embodiment, the direct answer can contain the answer to the question presented by the search query as well as a context for the answer.

FIG. 2 illustrates an example display 200 generated by the search algorithm management system 100 that includes a direct answer featured snippet portion 210 as a response to a search query 205 submitted by an end-user system. As shown in FIG. 2, in an embodiment, the structured data or answer that is returnable as a featured snippet direct answer which may include an answer portion 220 which is extracted from the featured snippet portion. In an embodiment, the answer portion may be highlighted keyword portion 230 of the featured snippet which is extracted and presented as the answer portion 220. In an embodiment, the direct answer-type featured snippet portion 210 can be generated by executing a selected search algorithm which corresponds to a search type or entity type corresponding to the search query 205.

In an embodiment, the search algorithm management system 100 generates a second type of featured snippet portion (also referred to as an "inline featured snippet portion"). In an embodiment, the search algorithm management system uses a field (also referred to as a "featured snippet field" that contains an identified excerpt of an unstructured document that provides context (e.g., one or more matching keywords, one or more matching substrings or highlighted portions) for the search results that demonstrate to the end-user system the context (e.g., "why") the document was returned as part of the search results. Advantageously, an end-user system 50 performing a search query that matches a search result including an unstructured document is provided with more than the unstructured document itself. In an embodiment, the search algorithm management system 100 provides the inline featured snippet portion of the unstructured document which includes information illustrating the context of the search result in relation to the search query. In an embodiment, the search algorithm management system 100 provides the inline featured snippet portion which identifies matching text or context associated with "why" the selected featured snippet portion of the document was returned to the end-user system.

FIG. 3 illustrates an example display 300 including inline featured snippet portions 310, 320 that are generated by the search algorithm management system 100, according to embodiments of the present disclosure. As shown in FIG. 3, a first search result 310 and a second search result 320 are identified by executing a search algorithm in response to a search query 305 received from an end-user system. The first search result 310 includes a first inline featured snippet portion 312 and the second search result includes a second inline featured snippet portion 322. As illustrated, the first inline featured snippet portion 312 includes a context or "why" the first search result 310 is returned in response to the search query 310. Likewise, the second inline featured snippet portion 322 includes a context corresponding to the second search result 320.

In an embodiment, the search algorithm management system 100 manages a searchable field of the search results referred to as a "documentsearch" field that is used to enable the generation of a featured snippet portion associated with a search results document. In an embodiment, the search algorithm management system 100 performs a search on fields associated with a search result that are marked or labeled "documentSearch". In an embodiment, the selected search algorithm is executed using a query that requests a source of the fields that are configured for documentSearch. In an embodiment, the search algorithm management system 100 obtains text from an entity index (e.g., an index associated with a knowledge graph relating to a merchant system 10) that is used to compute or generate featured snippet portions (e.g., direct answer featured snippet portion or inline featured snippet portion) concurrently with fetching a rendered profile. In an embodiment, fetching a rendered profile can include a process of expanding additional data from the knowledge graph to fill out or complete certain details. For example, if an entity record having an identifier of "document_123" contains a chunk of text that is part of a featured snippet, the search algorithm management system 100 can retrieve a human-readable title for that document (e.g., the title "Support Article: How to reset your ice maker").

In an embodiment, the search algorithm management system 100 configures one or more of the featured snippet portion types (e.g., the first type and/or the second type) to include a set of fields. In an embodiment, the fields of the first type of featured snippet portion can include one or more of a field name (e.g., an API name of the field that is configured for documentSearch), a value field (e.g., a direct answer that is returned from an extractive question/answer (QA) service, described in greater detail below), a featured-Snippet field (e.g., a context from within the field that the answer was extracted from), a matchedSubstrings field (e.g., highlighted information for the featuredSnippet field), and a relatedItem field (e.g., a full rendered profile of the entity that provided the direct answer). In an embodiment, the second type of snippet portion can be returned as a synthetic field within a data portion of a profile.

In an embodiment, the portion processing module 120 of the search algorithm management system 100 can implement an extractive question and answer (QA) service that is configured to perform post-retrieval processing of a set of search results identified in response to a search query (e.g., a query presented in question form for which the search results represent answers to the question). In an embodiment, the extractive QA service can include a first module associated with the first type of featured snippet portion (e.g., the featured snippet direct answer portion) and a second module associated with the second type of featured snippet portion (e.g., the inline featured snippet portion). In an embodiment, the first module (also referred to as a "direct answer featured snippet portion module") is configured to receive as an input the field configured for documentSearch from a set of search results (e.g., a set of top results) in the vertical, chunk and tokenize the field using a tokenizer process (also referred to as a "wordpiece tokenizer process") and send it to a container by a request (e.g., an HTTP request).

In an embodiment the first module of the portion processing module 120 is configured to execute a chunking or portioning process. In an embodiment, the chunking process generates or more chunks or portion of data (e.g., a set of number of wordpiece tokens) that are sent to the container. For example, a portion or chunk can be generated to include a maximum number of wordpiece tokens (e.g., 512 wordpiece tokens). In an embodiment, each chunk can include one or more of a tokenized input, a separator token, a chunk of tokenized body for an answer that is being searched, and a separator token. In an embodiment, to generate the chunks, the search algorithm management system determines a length of the input and separator. In an embodiment, the search algorithm management system 100 generates the body chunk by finding a highest newline index that maintains the sum of the input length, separator length and chunk length under a maximum wordpiece token level (e.g., 512 wordpiece tokens) and mark the corresponding point as the end of the chunk.

In an embodiment, the search algorithm management system 100 executes a call to the container (e.g., over HTTP) with a request (e.g., a POST request) and content-type application/JSON information. In an embodiment, the GPU container can score a set of N number of chunks (e.g., 2 chunks, 5 chunks, etc.) to enable a fast and efficient response time. In an embodiment, the search algorithm management system 100 can evaluate the N number of chunks for a top scoring entity (e.g., a top scoring document of the search results), and, if there are remaining chunk slots, send chunks from the second highest scoring entity (e.g., document) and so on until all of the chunk slots are filled.

In an embodiment, the response can contain a first array corresponding to the start token of a span level answer and a second array corresponding to the end token of the span level answer. In an embodiment, the span level answer can include a span of tokens in a text which directly answers a question. For example, for a question "When was Company ABC founded?", the corresponding chunk can include "Company ABC was founded in 2006." In this example, the span "2006" (which in this case is a single token) answers the question directly. In another example, for a question "How does Michael like his coffee?", the chunk can include "Michael takes his coffee black with no sugar." In this example, the span of tokens that answers the question would be "black with no sugar".

In an embodiment, each of these arrays includes an inner array corresponding to a chunk of the input and each inner array of the chunk array corresponds to a token from the chunk input. In an embodiment, when evaluating a chunk for a span level answer, the search algorithm management system 100 identifies a token with the highest score for a start logit (e.g., of a logit regression model) and for an end logit. In an embodiment, the search algorithm management system 120 executes a model to predict a likelihood that a span starts or ends at a given token index and a maximum value is selected. For example, the search algorithm management system 120 may identify the following token start likelihoods: [0.1, 0.02, 0.98, 0] and the following token end likelihoods: [0, 0.01, 0.02, 0.97]. In this example, the search result (e.g., response or "answer" to the search query) starts at the third token (i.e., in view of the 0.98 score being the highest in the set) and ends at the fourth token (in view of the 0.97 score being the highest in the set), in view of the identified likelihood scores.

In an embodiment, if the token index of the start is less than the token index of the end, then the corresponding chunk is identified as the "answer" to be provisioned to the end-user system. In an embodiment, the search algorithm management system returns as the direct answer the first of the chunks that contains an answer (e.g., highest start logit index<highest end logit index).

In an embodiment, the portion processing module 120 of the search algorithm management system 100 includes the second module (also referred to as an "inline featured snippet module") associated with the second type of featured snippet portion (e.g., the inline featured snippet portion). In an embodiment, the second module is configured to extract an inline featured snippet from each entity result. In an embodiment, the inline featured snippet portion can be extracted by identifying a first highlight in the body and include all text within a set of content (e.g., a paragraph or set of content between two newline characters). In an embodiment, the inline featured snippet portion can be extracted by identifying a densest set of highlights within a body within a single paragraph (e.g., a set of highlights having a highest density level (e.g., using a fraction) within a single paragraph relative to the densities of other sets of highlights). In an embodiment, the inline featured snippet can be extracted by returning a first paragraph, if no highlighted information is returned.

In an embodiment, the extracted inline featured snippet can use the highlighted information for the body that is passed in and then return a derived featured snippet portion with highlighted information that matches the new featured snippet by adjusting the offsets in the passed-in highlights. In an embodiment, the derived featured snippet portion can be identified by adding plus/minus N tokens to predicted start and end positions of the featured snippet portion.

In an embodiment, after the featured snippet-based search results are identified, if the documentSearch field is associated with a vertical, the search algorithm management system 100 can make a request concurrently with the request for rendered profiles to get entity ranking data that includes featured snippet portions (e.g., one or more of the inline featured snippet portion and the direct answer featured snippet portion) from a corresponding service (e.g., an entity search service such as a system configured to manage a knowledge graph associated with a merchant system). In an embodiment, the search algorithm management system 100 can resolve highlights for the body field prior to the call to a result enhancement service (e.g., a service which takes an existing set of search results, and either re-orders or improves the search results). In an embodiment, the result enhancement service can construct featured snippets (i.e., enhancing a set of documents). In an embodiment, the search algorithm management system 100 combines the search results and constructs an API response with the new fields present.

In an embodiment, the search algorithm management system 100 is configured to execute a density-based chunking process. In an embodiment, the density-based chunking process can be employed to identify an "answer" (e.g., an extracted snippet or portion of an unstructured document) that appears anywhere within the unstructured document (e.g., at an end of a long unstructured document having a large number of paragraphs and pages). In an embodiment, the search algorithm management system 100 can determine a density level of highlighted portions for each paragraph of the unstructured document. The density levels can be compared and a paragraph having a highest density of highlighted portions can be returned as the snippet portion in response to a search query.

FIG. 4 illustrates a flow diagram relating to an example method 400 including operations performed by a search algorithm management system (e.g., search algorithm management system 100 of FIG. 1), according to embodiments of the present disclosure. It is to be understood that the flowchart of FIG. 4 provides an example of the many different types of functional arrangements that may be employed to implement operations and functions performed by one or more modules of the graph merge system as described herein. Method 400 may be performed by a processing logic that may comprise hardware (e.g., circuitry, dedicated logic, programmable logic, microcode, etc.), software (e.g., instructions run on a processing device), or a combination thereof. In one embodiment, processing logic of the search algorithm management system executes the method 400 to generate search results including a selected portion or featured snippet in response to a search query relating to data associated with a merchant system.

In operation 410, the processing logic receives a search query from an end user system. In an embodiment, the search query input relates to data associated with a merchant system. In an embodiment, the search query can include one or more keywords, terms, or phrases that can be processed according to a search algorithm to identify a set of candidate documents that may be included in a returned search result. In an embodiment, the search query can be analyzed and assigned a search type. In an embodiment, based on the identified search type, a search algorithm that is selected by the merchant system for that search type can be executed to identify the corresponding search results.

In operation 420, the processing logic identifies, in view of the search query, a document (e.g., an unstructured document). In an embodiment, the document is identified from the knowledge graph associated with the merchant system in response to the execution of a search algorithm. The document includes keywords that satisfy the applicable search criteria associated with the executed search algorithm to identify the document as part of the search result set to be returned in response to the search query.

In operation 430, the processing logic identifies a set of portions of the document. In an embodiment, the document can be segmented or otherwise broken up into respective portions. In an embodiment, a document can be segmented into a number of portions having a threshold size. For example, a first document can be segmented or portioned into a set of portions including portion 1, portion 2, portion 3 . . . portion N.

In operation 440, the processing logic determines a keyword-matching density level for each of the portions of the set of portions of the document. In operation 450, the processing logic identifies a selected portion of the set of portions having a highest relative keyword-matching density level. In an embodiment, the selected portion is a featured snippet portion (e.g., a direct answer featured snippet portion or an inline featured snippet portion), as described above. In an embodiment, the selected portion can be identified in any portion (e.g., at a beginning, in the middle, at the end) of the document. The selected portion provides a highest level of relevancy to provide a context for the search result, which provides the end user system with additional or supplemental information relating to the search result.

Figure 5:
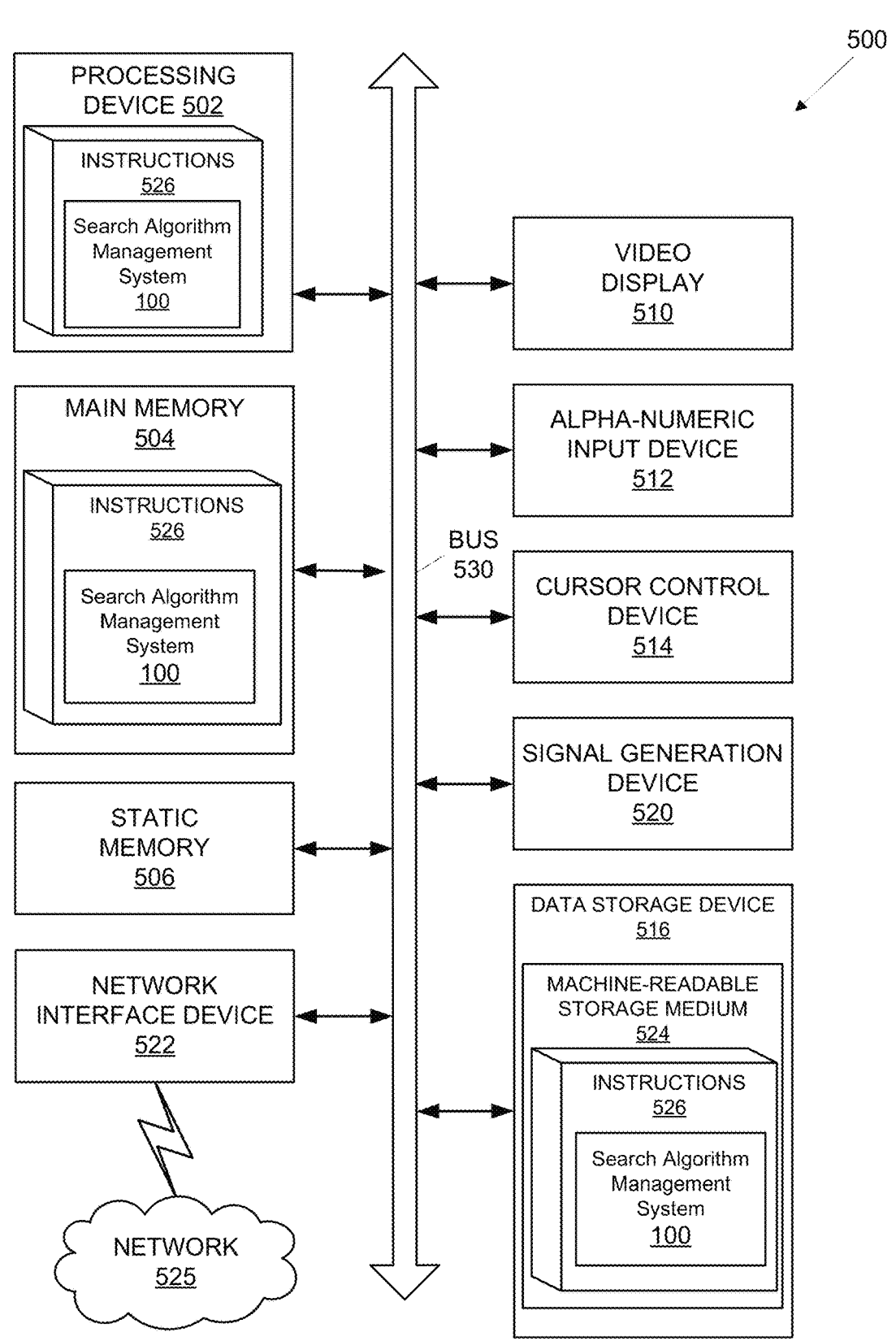
FIG. 5 illustrates an example computer system operating in accordance with some implementations.

In operation 460, the processing logic extracts the selected portion from the document. In an embodiment, the extracted selected portion can be surfaced and included as part of the search results to provide the end user system that originated the search query with context for the search result. In operation 470, the processing logic generates a graphical user interface including a search result responsive to the search query, the graphical user interface including the selected portion extracted from the document. Advantageously, the selected portion (e.g., a featured snippet) is displayed to the end user system with a search result (e.g., a link to the document), FIG. 5 illustrates an example computer system 500 operating in accordance with some embodiments of the disclosure. In FIG. 5, a diagrammatic representation of a machine is shown in the exemplary form of the computer system 500 within which a set of instructions, for causing the machine to perform any one or more of the methodologies discussed herein, may be executed. In alternative embodiments, the machine 500 may be connected (e.g., networked) to other machines in a local area network (LAN), an intranet, an extranet, or the Internet. The machine 500 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 500. Further, while only a single machine is illustrated, the term "machine" shall also be taken to include any collection of machines that individually or jointly execute a set (or multiple sets) of instructions to perform any one or more of the methodologies discussed herein.

The example computer system 500 may comprise a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 516), which may communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute a search algorithm management system 100 for performing the operations and steps discussed herein. For example, the processing device 502 may be configured to execute instructions implementing the processes and methods described herein, for supporting a search algorithm management system 100, in accordance with one or more aspects of the disclosure.

Example computer system 500 may further comprise a network interface device 522 that may be communicatively coupled to a network 525. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

Data storage device 516 may include a computer-readable storage medium (or more specifically a non-transitory computer-readable storage medium) 524 on which is stored one or more sets of executable instructions 526. In accordance with one or more aspects of the disclosure, executable instructions 526 may comprise executable instructions encoding various functions of the search algorithm management system 100 in accordance with one or more aspects of the disclosure.

Executable instructions 526 may also reside, completely or at least partially, within main memory 504 and/or within processing device 502 during execution thereof by example computer system 500, main memory 504 and processing device 502 also constituting computer-readable storage media. Executable instructions 526 may further be transmitted or received over a network via network interface device 522.

While computer-readable storage medium 524 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "analyzing," "using," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense.

What is claimed is:

1. A method comprising:
receiving a search query from an end user system, wherein the search query relates to information associated with a merchant system;
identifying, in view of the search query, a document associated with the merchant system;
generating at least one portion of the document;
determining a keyword-matching density level for each portion in the at least one portion of the document, the keyword-matching density level representing a relative density of keywords associated with the search query to a total number of words in each portion;
identifying, by a processing device, a selected portion of the at least one portion having a highest relative keyword-matching density level;
generating a first type and a second type of snippet portion based on the selected portion; and
generating a graphical user interface including a search result responsive to the search query, wherein the graphical user interface includes the first type and the second type of snippet portion from the selected portion of the document.

2. The method of claim 1, wherein the first type of snippet portion is a direct answer featured snippet portion or an inline featured snippet portion.

3. The method of claim 1, wherein the second type of snippet portion comprises information providing a context for the search result.

4. The method of claim 1, further comprising segmenting, by a first module, the selected portion comprising a determined number of word tokens and a separator token.

5. The method of claim 4, wherein the first type of snippet portion is associated with the first module.

6. The method of claim 1, further comprising extracting, by a second module, a densest set of highlights within the selected portion.

7. The method of claim 6, wherein the second type of snippet portion is associated with the second module.

8. The method of claim 1, further comprising executing a search algorithm to identify the document in view of the search query.

9. The method of claim 1, further comprising extracting the selected portion having the highest relative keyword-matching density level from the document.

10. The method of claim 1, further comprising receiving, from the merchant system, a selection of a first search algorithm of a set of search algorithms, wherein the first search algorithm relates to a first type of search query.

11. A non-transitory computer readable storage medium having instructions that, if executed by a processing device, cause the processing device to perform operations comprising:
receiving a search query from an end user system, wherein the search query relates to information associated with a merchant system;
identifying, in view of the search query, a document associated with the merchant system;
generating at least one portion of the document;
determining a keyword-matching density level for each portion in the at least one portion of the document, the keyword-matching density level representing a relative density of keywords associated with the search query to a total number of words in each portion;
identifying, by a processing device, a selected portion of the at least one portion having a highest relative keyword-matching density level;
generating a first type and a second type of snippet portion based on the selected portion; and
generating a graphical user interface including a search result responsive to the search query, wherein the graphical user interface includes the first type and the second type of snippet portion from the selected portion of the document.

12. The non-transitory computer readable medium of claim 11, wherein the first type of snippet portion is a direct answer featured snippet portion or an inline featured snippet portion.

13. The non-transitory computer readable medium of claim 11, wherein the second type of snippet portion comprises information providing a context for the search result.

14. The non-transitory computer readable medium of claim 11, further comprising segmenting, by a first module, the selected portion comprising a determined number of word tokens and a separator token.

15. The non-transitory computer readable medium of claim 14, wherein the first type of snippet portion is associated with the first module.

16. The non-transitory computer readable medium of claim 11, further comprising extracting, by a second module, a densest set of highlights within the selected portion.

17. The non-transitory computer readable medium of claim 16, wherein the second type of snippet portion is associated with the second module.

18. The non-transitory computer readable medium of claim 11, further comprising executing a search algorithm to identify the document in view of the search query.

19. The non-transitory computer readable medium of claim 11, further comprising extracting the selected portion having the highest relative keyword-matching density level from the document.

20. The non-transitory computer readable medium of claim 11, further comprising receiving, from the merchant system, a selection of a first search algorithm of a set of search algorithms, wherein the first search algorithm relates to a first type of search query.

* * * * *